United States Patent [19]

Smith et al.

[11] 4,447,595

[45] May 8, 1984

[54] POLYTEREPHTHALATES AND COPOLYMERS THEREOF HAVING HIGH CLARITY AND PROCESS FOR MAKING SAME

[75] Inventors: Richard R. Smith, Cuyahoga Falls; Mellis M. Kelley, Akron, both of Ohio

[73] Assignee: The Goodyear Tire & Rubber Company, Akron, Ohio

[21] Appl. No.: 415,305

[22] Filed: Sep. 7, 1982

[51] Int. Cl.³ .................... C08G 63/04; C08G 63/22; C08G 63/16
[52] U.S. Cl. .................................. 528/274; 525/437; 528/286; 528/295.3; 528/300; 528/302; 528/305; 528/308.6; 528/308.7
[58] Field of Search ............... 528/274, 286, 295.3, 528/300, 302, 305, 308.6, 308.7; 525/437

[56] References Cited

U.S. PATENT DOCUMENTS

| | | | |
|---|---|---|---|
| 4,045,431 | 8/1977 | Fagerburg | 528/295.3 |
| 4,155,889 | 5/1979 | Fagerburg | 528/300 |
| 4,340,721 | 7/1982 | Bonnebat et al. | 528/274 X |
| 4,361,681 | 11/1982 | Bernhardt | 528/305 X |

*Primary Examiner*—Lucille M. Phynes
*Attorney, Agent, or Firm*—Alvin T. Rockhill

[57] ABSTRACT

This invention relates to polyethylene terephthalate and copolymers thereof having high clarity and process for making the same. The invention provides a process for making PET using protonic acid catalysts which result in a polymer having a level of haze which is lower than has heretofore been attainable, using conventional metallic catalysts. Further, the polyesters so produced have a lower melt temperature which improves the processability.

22 Claims, No Drawings

POLYTEREPHTHALATES AND COPOLYMERS THEREOF HAVING HIGH CLARITY AND PROCESS FOR MAKING SAME

TECHNICAL FIELD

The present invention relates to polyethyleneterephthalate and copolymers thereof having a high degree of clarity resulting from the use of protonic acid polymerization catalysts. The high clarity polyesters so produced are useful as packaging materials for example, as containers or films.

BACKGROUND ART

In recent years, much activity and invention in the art of polyesters has centered around the development of articles made from polyethylene terephthalate or PET. Containers constructed of PET have recently found wide acceptance in the packaging of food stuffs, medicines and consumer products.

The manufacture of PET and various copolymers has heretofore generally required the use of catalysts based on heavy metals such as antimony, manganese, titanium, etc. If residues of these catalysts remain in the polyester material, the clarity of the material is greatly reduced such that the material exhibits a hazy appearance. Further, the residues act as nucleating agents for crystallizable polyesters such as PET thus making the control of crystallization more difficult, for example, the temperature of the reaction must be kept within very narrow limits to prevent excessive crystallization which is also manifested as haze. Therefore, for many applications, removal of the catalyst residue is required after polymerization, commonly by filtration or metal complexation. These additional steps of course add considerably to the processing costs and are in any case never completely successful in residue removal. In addition, metallic catalyst residues can also accelerate the formation of undesirable by-products such as acetaldehyde during the preparation and/or processing of the polyester material.

Reference to the use of acids as polymerization catalysts can be found in *Organic Chemistry of Synthetic High Polymers*, Lenz, R. W., John Wiley, New York, N.Y., 1967, pages 81-91, and *Textbook of Polymer Science*, 2nd Ed., Billmeyer, F. W., Wiley-Interscience, New York, N.Y., 1971, pages 264-267. While the authors generally describe the use of acids, they do not disclose the use of protonic acid catalysts to increase clarity in crystallizable polyesters.

DISCLOSURE OF INVENTION

It is an aspect of the present invention to provide, as well as a process for making, polyethylene terephthalate and copolymers thereof having a high degree of clarity.

It is another aspect of the present invention to provide, as well as a process for making polyethylene terephthalate and copolymers thereof which do not require the removal of catalyst residues subsequent to polymerization.

It is still another aspect of the present invention to provide, as well as a process for making, polyethylene terephthalate and copolymers thereof, as above, which may be used as packaging materials.

It is yet another aspect of the present invention to provide polyethylene terephthalate and copolymers thereof having low by-product formation, e.g. acetaldehyde during manufacturing.

It is still another aspect of the present invention to provide, as well as a process for making, polyethylene terephthalate and copolymers thereof, as above, which are less susceptible to excess crystallization during manufacture.

These and other aspects of the present invention will become more apparent from the following description which sets forth the best mode and preferred embodiments of the invention, and are achieved by: a process for making a polyester having high clarity, comprising: providing a quantity of one or more dicarboxylic compounds selected from the group consisting of a dicarboxylic acid or alkyl ester thereof having from 4 to 40 carbon atoms, and combinations thereof; providing a quantity of one or more glycols selected from the group consisting of ethylene glycol, glycols having from 3 to 12 carbon atoms, glycol ethers having from 4 to 12 carbon atoms, and combinations thereof; providing a protonic acid catalyst; and reacting said dicarboxylic compound and said glycol in the presence of said protonic acid catalyst to form the polyesters; wherein at least 50 mole percent of said dicarboxylic quantity is selected from the group consisting of terephthalic acid and alkyl esters thereof having from 10 to 20 carbon atoms; wherein at least 50 mole percent of said glycol quantity is ethylene glycol; and wherein said polyester has high clarity by visual observation.

BEST MODE FOR CARRYING OUT THE INVENTION

The present invention relates to providing polyesters having a high degree of clarity and reduced amounts of by-products, for example acetaldehydes, which results from the substitution of protonic acid catalysts for the metal based polymerization catalysts of the prior art. Polyesters which may be produced using the catalysts of the invention include, in general, the reaction product of a dicarboxylic compound and a diol. Specifically, the polyester is produced by the reaction of a dicarboxylic acid or alkyl ester thereof with a glycol. As known to those skilled in the art, polyesters are generally made in two stages. In the first stage called the esterification or transesterification stage, the dicarboxylic acid or diester is reacted with the glycol at elevated temperatures and at either atmospheric or elevated pressures with water or the corresponding alcohol being produced. In the second or polycondensation stage, a vacuum is gradually applied, generally catalysts are utilized, and additional water along with excess glycol are withdrawn as condensation by-products. Various polyesters can be made by such a polymerization including polyethylene terephthalate and various copolymers thereof.

Solid state polymerizations can also be utilized if crystallizable copolymers having high melting points are made. In this process, a melt polycondensation is carried out as described above, until generally the intrinsic viscosity of the polymer reaches about 0.2 or higher for example, up to about 0.6. At this point, the solution melt is cooled to produce a solid which is then pelletized, chopped, etc. The pellets are then subjected to solid state polymerization wherein a vacuum is applied at a temperature below the melting point of the partially formed polymer. Thus, the polymer is actually polymerized in a solid state, with the polycondensation reaction being continued in such a state. Generally, the solid state polymerization is continued until the intrinsic viscosity of the polymer reaches any desired level, such as from about 0.6 to about 1.0 or even higher. Desirably, the intrinsic viscosity ranges from about 0.70 to about 0.90. Intrinsic viscosity is measured in deciliters/gram using a 60/40 phenol/tetrachloroethane solution at 25° C.

In the prior art, catalysts were often utilized both for the esterification or transesterification and the polycondensation steps. Polymers having low clarity are produced when conventional metallic catalysts such as compounds of antimony, titanium, manganese, and germanium are used as catalysts in either or both steps. The use of protonic acids as catalysts, however, effectively catalyzes the reaction, yet produces a polymer having high clarity.

Inorganic acids which have utility as polymerization catalysts include sulfuric, phosphoric, sulfurous, sulfamic, that is, $HNH_2SO_3$, and the like. Organic acids which may be used include trichloroacetic, dichloroacetic, p-toluene sulfonic, and the like. Generally, the amount of acid utilized is dependent upon two variables, namely, the acid's dissociation constant, abbreviated $pK_a$ and its volatility.

In theory, any protonic acid could be used as an esterification or polycondensation catalyst, however as a practical matter, acids are used having a $pK_a$ of about 2.5 or less and preferably 2.0 or less. Also, acids which do not volatilize to an appreciable extent under the high vacuum and temperature conditions of the second polymerization step described earlier are desired. The reason for this requirement is that a threshhold number of catalyst species must be present in the polycondensation step in order to effectively catalyze the reaction. Thus, for example, acids having $pK_a$ values greater than about 2.5 are required in inconveniently large amounts. Further, highly volatile acids, which are lost during the high vacuum and high temperature stage, must be added in initially high concentrations to maintain the threshold amount of acid during the second stage.

In this regard, it should be noted that a highly volatile acid, such as for example HCl, while normally not useful as a polymerization catalyst may be utilized if loss of the acid is prevented during the polyesterification step. For example, the volatile acid may be complexed or encapsulated so that its apparent volatility is reduced. Further, the invention contemplates the use of large amounts of acids having $pK_a$'s of above 2.5 if such large amounts do not have a detrimental effect on the polymer in its intended use. Generally, the amount of acid utilized can vary from about 0.001 to about 3 weight percent based on the total weight of the polymer formed. This basis, rather than the weight of the monomer starting materials is used because the former is unaffected by the presence of monomers in excess of stoiciometric, a variable which can change from batch to batch. The acids are preferably used in an amount between about 0.01 and about 1.0 weight percent with between about 0.05 and 0.5 being preferred. The actual amount of acid will of course vary depending upon its particular $pK_a$ value and its volatility.

As mentioned above, haze in polyesters has at least two sources of formation: metal catalytic residue itself and crystallites nucleated by metallic residues. As to the latter, the residue particles provide convenient sites, if conditions are favorable for the initiation of crytallization. In general, any polyester having a tendency to crystallize at processing temperatures will exhibit significant haze in the final product if metallic catalyst residues are present. Thus, careful control of processing temperatures is required to reduce the contribution of crystallization to the level of haze. However, this source of haze cannot be completely eliminated. Similarly, the procedures employed to remove catalytic residue are seldom completely successful, so that even those polyesters which do not crystallize can have objectionable amounts of haze if metallic catalysts are used.

Accordingly, a variety of polyesters and copolyesters exhibit reduced haze formation with the above-described protonic acid catalysts whether or not the polyesters are crystallizable. In most cases however, the use of the invention achieves a more dramatic result in crystallizable polyesters such as polyethylene terephthalate, which, as the high volume resin used in container and film applications, often is required to have high clarity.

Various copolymers of PET also exhibit reduced haze using the invention. As defined, a copolymer of polyethylene terephthalate is a polyester made from monomers wherein the total quantity of dicarboxylic compound, i.e., an acid or alkyl ester thereof, comprises at least 50 mole percent terephthalic acid or ester and the glycol comprises at least 50 mole percent ethylene glycol or, alternatively, the oligomer esters used in the polycondensation reaction comprise at least 50 mole percent ethylene terephthalate. Various copolymers may thus be made by esterifying other dicarboxylic compounds having from 4 to 40 carbon atoms, and other glycols with terephthalic acid or ester and ethylene glycol. The dicarboxylic compound which is not terephthalic acid or an ester thereof can be an alkyl dicarboxylic acid, an aryl dicarboxylic acid, an alkyl substituted aryl dicarboxylic acid or a dimer acid. Alkyl dicarboxylic acids desirably contain from 4 to 12 carbon atoms. If the acids are aryl or alkyl substituted aryl acids, they desirably contain from 8 to 9 respectively to about 16 carbon atoms. Typical examples of linear or alkyl dicarboxylic acids include glutaric acid, adipic acid, azelaic acid, sebacic acid, and the like.

Dimer acids can also be used having from about 34 to 40 carbon atoms and preferably 36 carbon atoms. The dimer is itself prepared from an unsaturated fatty acid containing 18 carbon atoms such as linoleic or linolenic acid or the monohydric alcohol esters thereof. The actual preparation and structure of dimerized $C_{18}$ fatty acids are described in J.A.C.S. 66,84 (1944) and U.S. Pat. No. 2,347,562 both of which are fully incorporated herein by reference. Several different grades of dimer acid are available from commercial sources and these differ from each other primarily in the amount of monobasic and trimer acid fractions and the degree of unsaturation. It is preferred, for purposes of this invention, that the dimer acid be substantially free of the monobasic and trimer acid fractions, that is less than 8% by weight, and esentially completely saturated, and may be added after the transesterification reaction, that is, at the condensation stage. Two different grades of dimer acid which are useful in preparing the polyesters herein described and meet the above requirements are available from Emery Industries, Inc. under the trade name Empol 1010 dimer acid typically containing 97% dimer acid, 3% trimer acid and essentially no monobasic acids in extremely low unsaturation, and Empol 1014 typically containing 95%, 4%, and 1% of dimer, trimer and monobasic acids respectively.

Typical examples of aryl acids other than terephthalic include isophthalic acid, orthophthalic acid, naphthalic acid, for example, 2,6-naphthalene dicarboxylic acid, and the like. Specific examples of alkyl substituted aryl acids include the various isomers of dimethylphthalic acids such as dimethylorthophthalic acid and dimethylisophthalic acid, the various isomers of diethylphthalic acids such as diethylorphthalic acid and diethylisophthalic acid, the various isomers of dimethylnaphthalic acids such as 3,7-dimethyl-2,6-naphthalene dicarboxylic acid and 2,5-dimethyl-1,6-naphthalene dicarboxylic acid, and the various isomers of diethylnaphthalene dicarboxylic acid and the like.

It is well known to those skilled in the art, in lieu of the various dicarboxylic acids, the various diesters thereof can be utilized. Thus, esters of alkyl dicarboxylic acids containing a total of from 6 to about 20 carbon atoms, esters of aryl dicarboxylic acids having from 10 to 20 carbon atoms as well as esters of alkyl substituted aryl dicarboxylic acids containing from 11 to about 20 carbon atoms may be utilized. Examples of alkyl diesters include those made from glutaric acid, adipic acid, azelaic acid, or sebacic acid, and the like. Specific examples of various esters of alkyl substituted aryl dicarboxylic acids include 1,4dimethyl-dimethylisophthalate, 1,3-diethyl-dimethylisophthalate, 2,5-dimethyl-1,6-dimethylnaphthalate, and the like.

The amount of the dicarboxylic acid or esters thereof utilized with the terephthalic acid or ester on a mole basis is generally from about 0, or from about 0.1 to about 50% of the total amount of dicarboxylic compound, that is, the amount of terephthalic and non-terephthalic acid and/or ester starting material. Desirably, the amount is from about 0 or 0.1 percent to about 30 mole percent and preferably from about 0 or 0.1 percent to about 10 mole percent.

As noted above, in addition to the nonterephthalic diacids or esters thereof, up to about 50 mole percent of glycols other than ethylene glycol and having from 3 to 12 carbon atoms can be utilized. Glycols having from 3 to 10 carbon atoms are desired while those having from 3 to 8 carbon atoms, especially aliphatic or cycloaliphatic glycols are preferred. Examples of glycols include propylene glycols, such as trimethylene glycol, butylene glycol such as tetramethylene glycol, neopentyl glycol, 1,4-cyclohexanedimethanol and the like. The amount of non-ethylene glycol utilized is desirably 35 mole percent or less of the total molar amount of glycol and preferably less than 15 mole percent.

Another class of glycols include the glycol ethers which contain from 4 to 12 carbon atoms, preferably from 4 to 8 carbon atoms, with specific examples including diethylene glycol and 1,4-dihydroxyethoxy benzene.

When forming a copolymer of the present invention, generally all of the various reactants are added and reacted in a conventional manner. For example, all reactants are commonly added at the esterification or the transesterification stage which is followed by a polycondensation stage to produce the polyester. These polyesters are generally random copolyesters. However, block copolyesters can be produced according to the invention by conducting the non-terephthalic compound reaction separate from the terephthalic compound reaction and reacting the two products together in a conventional manner known to the art to obtain the block copolyesters. As also known to the art, random copolyesters can be obtained even by adding the non-terephthalic compound at nearly the end of the transesterification or esterification stage.

The total amounts of glycol utilized in comparison to the total amount of acids or esters thereof are conventional. Typically, the mole ratio of the total amount of glycol utilized with the total amount of acid is approximately 1.05 to 2.5 and approximately 2.2 when esters are used in lieu of the acids. Of course, higher or lower ratios can be used as known to the art. Naturally, if the terephthalic compound is an ester and a copolymer is made, the other monomer is also preferably an ester, that is, a diester of a dicarboxylic acid. When esters are used as a starting material, the polyester is therefore made using any conventional ester route as is well known to the art. If the terephthalic compound is an acid, and a copolymer is made, the other acid monomer is preferably a dicarboxylic acid (other than the terephthalic acid), etc., and the polyester is made according to any conventional ester route.

It has been found that the point of addition of the protonic acid catalyst during the polymerization has a great effect on the physical properties of the polyester or copolyester. For example, if the acid is added during the esterification step, a polymer is produced having a lower melting point and lower glass transition temperature ($T_g$) than a polymer produced from similar monomers where the point of addition of the acid is in the polycondensation step. If the acid is added during the polycondensation step or thereafter, there is little or no reduction in the melting point, i.e. melt temperature ($T_m$) or in $T_g$. A lower $T_m$ allows lower processing temperatures to be used in the manufacture of a finished article, hence resulting in greater energy efficiency. Melt temperatures for selective polymerizations can be seen in Table I, which summarizes the results of the examples given below.

The physical properties of the polyester are also affected by the amount of glycol charged in the initial esterification reaction. That is, as the ratio of glycol to carboxylic compound is increased, a more flexible material is produced. Further, the point of addition of the protonic acid catalyst affects the degree of brittleness in that, as the point of addition of the acid is delayed, there is less opportunity for the acid to react with the glycol in a side reaction to form a dimer, for example, diethylene glycol. The presence of dimer glycols in the polyester backbone increases the flexibility of the polymer.

In the examples and in the Table, the following definition of terms will apply:

PPM is the parts per million of catalyst or toner per million parts by weight of polymer.

$T_m$ is the crystalline melting point in °C. measured with a differential thermal analyzer.

Haze value, that is, the degree of clarity is measured by visual comparison between both acid catalyzed and metal catalyzed polyesters. Likewise, the color of polyesters having various toners added is by observation. The use of toners is well known in the art and a variety are available commercially. High clarity polyester is generally slightly yellow in color and the addition of blue toner neutralizes the yellow tint to produce a polyester which is water clear.

EXAMPLE 1

Polyethyelene terephthalate, PET, was prepared in the following manner. A stainless steel reactor was charged with 17.3 pounds of terephthalic acid and 7.74 pounds of ethylene glycol. The reactor was sealed and pressurized to 35 psi with nitrogen gas. This pressure was maintained while the mixture was heated from 250° to 260° C. over a two hour period during which 1240 milliliters of water was distilled from the mixture. This oligomeric (stage 1) product was discharged from the reactor and subsequently used as the starting material for the polycondensations described in the following examples.

The polycondensation reaction was carried out in a small glass reactor tube using 60 grams of the above-described stage 1 oligomeric product and about 0.025 grams of concentrated sulfuric acid diluted with 2 milliliters of ethylene glycol. The stage 1 product was heated to about 240° C. under a nitrogen atmosphere prior to addition of the catalyst. The reaction mixture was maintained at these conditions for 20 minutes with additional water being removed. The pressure in the reactor was lowered to about 0.5 mm mercury during the next hour and the temperature of the system was increased to about 275° C. After about 2 hours at these conditions, a high melt viscosity polymer of very high clarity was obtained. This polymer had a light yellow color. Comparative properties are shown in Table I.

EXAMPLE 2

Following the procedure of Example 1, PET was prepared using p-toluenesulfonic acid (170 ppm) as catalyst. After 2 hours reaction time, a high melt viscosity polymer was obtained which exhibited excellent clarity. This polymer was only slightly yellow. Comparative properties are shown in Table I.

EXAMPLES 3 THROUGH 7

Following the procedure of Example 1, PET was prepared using either sulfuric acid or p-toluenesulfonic acid as the polycondensation catalyst. In these examples, cobalt acetate was added in varying amounts along with the catalyst. The cobalt acetate (10 to 30 parts per million polymer) significantly reduced the yellow coloration of the polymers and surprisingly had little effect on the clarity of the polymers when used below the 30 ppm level. Essentially colorless polymers were obtained. In Examples 6 and 7, 30 ppm cobalt acetate was used and a very slight haze was noted in the polymer. Comparative polymer properties are shown in Table I.

COMPARATIVE EXAMPLE 8

Following the procedure of Example 1, PET was prepared using 30 ppm of cobalt acetate but no strong acidic catalyst. The polymer obtained appeared to be of relatively high molecular weight and was essentially colorless but quite hazy. The use of lower levels of cobalt acetate would likely result in reduced haze but also an unacceptably low molecular weight polymer. The use of a strong protonic acid for polycondensation catalysis and low levels of cobalt acetate as a toner is a preferred process.

EXAMPLES 9, 10 AND 11

Following the procedure of Example 1, PET was prepared using either sulfuric acid or p-toluenesulfonic acid as catalyst and varying levels of Solva perm Blue, a melt soluble dye, as toner. Use of very low levels of Solva perm Blue (1–3 ppm) resulted in essentially colorless polymers having excellent clarity. Comparative polymer properties are shown in Table 1. The use of this melt soluble dye is especially preferred since very low levels are required to obtain colorless, high clarity PET.

EXAMPLES 12 AND 13

Following the procedure of Example 1, PET was prepared using sulfonic acid as catalyst and cobalt acetate as toner. In Example 12, a high molecular weight, high clarity polymer with a slight yellow color was obtained. In Example 13, higher levels of sulfonic acid and cobalt acetate resulted in a hazy polymer with a deeper yellow color. These examples indicate that a high clarity, colorless polymer should be obtainable using the appropriate levels of sulfonic acid and toner. Polymer data are shown in Table I.

COMPARATIVE EXAMPLE 14

Following the procedure of Example 1, PET was prepared using 210 ppm antimony (as $Sb_2O_3$) as catalyst. A phosphorus stabilizer is optionally used in conjunction with $Sb_2O_3$. The polymer obtained is high molecular weight but exhibits an observable haze and is often gray to yellow in color depending on the amount and type of stabilizer used. The absence of stabilizer in this system yields a somewhat yellowish polymer with an observable haze. Further, metallic species in the form of catalyst residues are known to be nucleating sites for PET crystallization. In certain packaging applications, such as PET beverage bottles, the presence of nucleating agents is undesirable since they often lead to uncontrolled crystallization and bottle haze if bottle processing conditions are not precisely controlled. The use of non-metallic polycondensation catalysts such as sulfuric acid and p-toluenesulfonic acid yields a polymer requiring lower processing temperatures and giving more latitude in process temperature control to produce molded articles of excellent clarity.

TABLE I

PROPERTIES OF ACID CATALYZED PET

| | Catalyst | | Toner | | Polymer Properties | | |
|---|---|---|---|---|---|---|---|
| Example | Type[a] | Amount (ppm)[b] | Type | Amount (ppm) | Tm(°C.) | Clarity[d] | Color |
| 1 | $H_2SO_4$ | 400 | None | — | — | A | pale yellow |
| 2 | p-TSA | 180 | None | — | — | A | slightly yellow |
| 3 | $H_2SO_4$ | 80 | Cobalt Acetate | 10 | 244 | A | Very slight yellow |
| 4 | $H_2SO_4$ | 80 | Cobalt Acetate | 20 | — | A–B | Very slightly yellow |
| 5 | p-TSA | 170 | Cobalt Acetate | 20 | 251 | A | Colorless |
| 6 | p-TSA | 170 | Cobalt Acetate | 30 | — | B | Colorless |
| 7 | p-TSA | 340 | Cobalt Acetate | 30 | — | C | Colorless |

TABLE I-continued

PROPERTIES OF ACID CATALYZED PET

| Example | Catalyst Type[a] | Catalyst Amount (ppm)[b] | Toner Type | Toner Amount (ppm) | Tm(°C.) | Clarity[d] | Color |
|---|---|---|---|---|---|---|---|
| 8 | None | — | Cobalt Acetate | 30 | — | C | Colorless |
| 9 | $H_2SO_4$ | 400 | Solvaperm[c] blue | 3 | — | A | Slight blue |
| 10 | $H_2SO_4$ | 400 | Solvaperm[c] blue | 1 | — | A | Very slight yellow |
| 11 | p-TSA | 680 | Solvaperm[c] blue | 1 | — | B | Very slight yellow |
| 12 | S.A. | 170 | Cobalt Acetate | 15 | — | A | Very slight yellow |
| 13 | S.A. | 340 | Cobalt Acetate | 30 | — | C | Pale yellow |
| 14 | $Sb_2O_3$ | 210 | — | — | 259 | C | Gray |

[a] = p-TSA = p = toluensulfonic acid;
S.A. — sulfonic acid
[b] = based on weight of polyester formed
[c] = Solvaperm blue -Melt soluble dye from American Hoerchst Corporation
[d] = Clarity classifications:
A = excellent clarity, high transparency;
b = very slight haze, nearly transparent;
c = slightly haze with gray-metallic coloration, nearly transparent.

While in accordance with the Patent Statutes, only the best mode and preferred embodiments have been disclosed, it is to be understood that the invention is not limited thereto or thereby. Therefore, for a fuller understanding of the true scope of the invention, reference should be made to the following appended claims.

What is claimed is:

1. A process for making a polyester having high clarity, comprising:
    providing a quantity of one or more dicarboxylic compounds selected from the group consisting of a dicarboxylic acid or alkyl ester thereof having from 4 to 40 carbon atoms, and combinations thereof;
    providing a quantity of one or more glycols selected from the group consisting of ethylene glycol, glycols having from 3 to 12 carbon atoms, glycol ethers having from 4 to 12 carbon atoms, and combinations thereof;
    providing a protonic acid catalyst; and
    reacting said dicarboxylic compound and said glycol in the presence of said protonic acid catalyst to form the polyesters;
    wherein at least 50 mole percent of said dicarboxylic quantity is selected from the group consisting of terephthalic acid and alkyl esters thereof having from 10 to 20 carbon atoms;
    wherein at least 50 mole percent of said glycol quantity is ethylene glycol; and
    wherein said polyester has high clarity.

2. A process according to claim 1, wherein said dicarboxylic quantity includes dicarboxylic compounds selected from the group consisting of alkyl substituted terephthalic acid having from 9 to 16 carbon atoms, alkyl diesters of alkyl substituted terephthalic acid having from 11 to 20 carbon atoms, alkyl dicarboxylic acids having from 4 to 20 carbon atoms, aryl or alkyl substituted aryl dicarboxylic acids having from 8 or 9 respectively to 16 carbon atoms, dimer acids having from 34 to 40 carbon atoms, alkyl diesters of alkyl dicarboxylic acids having from 6 to 20 carbon atoms, and alkyl diesters of aryl or alkyl substituted aryl dicarboxylic acids having from 10 or 11 respectively to 20 carbon atoms; and
    wherein said glycol quantity includes from 0 to 50 mole percent of a non-ethylene glycol selected from the group consisting of glycols having from 3 to 10 carbon atoms and glycol ethers having from 4 to 8 carbon atoms.

3. A process according to claim 2, wherein said terephthalic compound is selected from the group consisting of terephthalic acid, dimethyl terephthalate, and diethyl terephthalate, and wherein said glycol other than said ethylene glycol has from 3 to 8 carbon atoms, and wherein said non-ethylene glycol comprises less than 35 mole percent of said glycol quantities; and
    wherein said dicarboxylic compound other than said terephthalic compound is selected from the group consisting of isophthalic acid, dimethylisophthalate, dimer acid having 36 carbon atoms, 2,6-naphthalene dicarboxylic acid, and azelaic acid, the amount of said non-terephthalic compound being 10 mole percent or less.

4. A process according to claim 3, wherein said glycol other than said ethylene glycol is a glycol selected from the group consisting of cyclohexanedimethanol, tetramethalene glycol and propylene glycol, wherein the amount of said glycol is 15 mole percent or less; and
    wherein said non-terephthalic compound is isophthalic acid or dimethylisophthalate.

5. A process according to claim 4, wherein said protonic acid catalyst has a $pK_a$ less than or equal to 2.5.

6. A process according to claim 5, wherein said protonic acid catalyst is present in said reaction in an amount from about 0.001 to about 3 weight percent of the polyester formed.

7. A process according to claim 6, wherein said protonic acid catalyst is selected from the group consisting of sulfuric, phosphoric, p-toluene sulfonic, sulfurous, sulfamic and trichloroacetic acids.

8. A process according to claim 7, wherein said polymer consists of polyethyelene terephthalate and wherein said protonic acid catalyst is sulfuric acid.

9. A process according to claim 8, wherein said sulfuric acid catalyst ranges from about 0.01 to about 1.0 weight percent of the polyester formed.

10. A process according to claim 9, wherein said process further comprises using a cobalt acetate or a solvaperm blue toner.

11. A process according to claims 1, 2, 4, or 10, wherein said polyester is suitable for making a film.

12. A process according to claims 1, 2, 4, or 10, wherein said polyester is suitable for making a container.

13. A polyester having high clarity, comprising the reaction product of:
   a quantity of one or more dicarboxylic compounds selected from the group consisting of a dicarboxylic acid or alkyl ester thereof having from 4 to 40 carbon atoms, and combinations thereof;
   a quantity of one or more glycols selected from the group consisting of ethylene glycol, glycols having from 3 to 12 carbon atoms, glycol ethers having from 4 to 12 carbon atoms, and combinations thereof; and
   a protonic acid catalyst;
   wherein at least 50 mole percent of said dicarboxylic quantity is selected from the group consisting of terephthalic acid and alkyl esters thereof having from 10 to 20 carbon atoms;
   wherein at least 50 mole percent of said glycol quantity is ethylene glycol; and
   wherein said polyester has high clarity.

14. A polyester according to claim 13, wherein said dicarboxylic quantity includes dicarboxylic compounds selected from the group consisting of alkyl substituted terephthalic acid having from 9 to 16 carbon atoms, alkyl esters of alkyl substituted terephthalic acid having from 11 to 20 carbon atoms, alkyl dicarboxylic acids having from 4 to 20 carbon atoms, aryl or alkyl substituted aryl dicarboxylic acids having from 8 or 9 respectively to 16 carbon atoms, dimer acids having from 34 to 40 carbon atoms, alkyl diesters of alkyl dicarboxylic acids having from 6 to 20 carbon atoms, and alkyl diesters of aryl or alkyl substituted aryl dicarboxylic acids having from 10 to 11 respectively to 20 carbon atoms; and
   wherein said glycol quantity includes from 0 to 50 mole percent of a non-ethylene glycol selected from the group consisting of glycols having from 3 to 10 carbon atoms and glycol ethers having from 4 to 8 carbon atoms.

15. A polyester according to claim 14, wherein said terephthalic compound is selected from the group consisting of terephthalic acid, dimethyl terephthalate, and diethyl terephthalate, and wherein said glycol other than said ethylene glycol has from 3 to 8 carbon atoms, and wherein said non-ethylene glycol comprises less than 35 mole percent of said glycol quantities; and
   wherein said dicarboxylic compound other than said terephthalic compound is selected from the group consisting of isophthalic acid, dimethylisophthalate, dimer acid having 36 carbon atoms, 3,6-naphthalene dicarboxylic acid, and azelaic acid, the amount of said non-terephthalic compound being 10 mole percent or less.

16. A polyester according to claim 15, wherein said glycol other than said ethylene glycol is a glycol selected from the group consisting of cyclohexanedimethanol, tetramethylene glycol and propylene glycol wherein the amount of said glycol is 15 mole percent or less; and
   wherein said non-terephthalic compound is isophthalic acid or dimethylisophthalate.

17. A polyester according to claim 16, wherein said protonic acid catalyst has a $pK_a$ less than or equal to 2.5; and
   wherein said protonic acid catalyst is present in said reaction in an amount between 0.001 and 3 weight percent of the polyester formed.

18. A polyester according to claim 17, wherein said protonic acid catalyst is selected from the group consisting of sulfuric, phosphoric, p-toluene sulfonic, sulfurous, sulfamic and trichloroacetic acids.

19. A polyester according to claim 18, wherein said polyester consists of polyethylene terephthalate and wherein said protonic acid catalyst is sulfuric acid ranging in an amount from about 0.01 to about 1.0 weight percent of the polyester formed.

20. A polyester according to claim 19, wherein said process further comprises using a cobalt acetate or a solvaperm blue toner.

21. A polyester according to claim 13, 14, 16 or 20, wherein said polyester is suitable for making a film.

22. A polyester according to claim 13, 14, 16, or 20, wherein said polyester is suitable for making a container.

* * * * *